(12) United States Patent
Canning et al.

(10) Patent No.: US 6,706,455 B1
(45) Date of Patent: Mar. 16, 2004

(54) METHOD FOR CREATING AN OPTICAL STRUCTURE WITHIN A PHOTOSENSITIVE LIGHT TRANSMISSIVE MATERIAL AND OF ENHANCING THE PHOTOSENSITIVITY OF THE PHOTOSENSITIVE LIGHT TRANSMISSIVE MATERIAL

(75) Inventors: John Canning, Carlton (AU); Mattias Lennart Aslund, Cronulla (AU)

(73) Assignee: The University of Sydney, Sydney (AU)

( * ) Notice: Subject to any disclaimer, the term of this patent is extended or adjusted under 35 U.S.C. 154(b) by 0 days.

(21) Appl. No.: 09/959,526

(22) PCT Filed: May 1, 2000

(86) PCT No.: PCT/AU00/00395

§ 371 (c)(1),
(2), (4) Date: Jan. 3, 2002

(87) PCT Pub. No.: WO00/67054

PCT Pub. Date: Nov. 9, 2000

(30) Foreign Application Priority Data

Apr. 30, 1999 (AU) ............................................... PQ0074
Nov. 5, 1999 (AU) ............................................... PQ3888

(51) Int. Cl.⁷ ............................. G03F 9/00; G03C 5/00
(52) U.S. Cl. ............................ 430/30; 430/17; 430/321
(58) Field of Search .............................. 430/30, 321, 17

(56) References Cited

U.S. PATENT DOCUMENTS

| 5,400,422 A | 3/1995 | Askins et al. .................. 385/37 |
| 5,422,745 A | 6/1995 | Williams et al. ................ 359/3 |
| 5,830,622 A | 11/1998 | Canning et al. ............ 430/321 |

FOREIGN PATENT DOCUMENTS

| GB | 2 291 208 A | 1/1996 |
| WO | WO 98/06001 | 2/1998 |
| WO | WO 00/49437 | 8/2000 |

*Primary Examiner*—Christopher G. Young
(74) *Attorney, Agent, or Firm*—Larson & Taylor, PLC

(57) ABSTRACT

A method of creating an optical structure within a photosensitive light transmissive material comprising the steps of: (a) exposing a selected region of the material to radiation at a wavelength selected to effect a refractive index change in the material; (b) terminating the exposure to the radiation at a selected fluence; and afterwards (c) exposing at least one portion of the selected region to UV radiation at a level sufficient to vary the refractive index of the material within the selected region to form the optical structure; wherein the fluence is selected such that the optical structure is substantially thermally stable without a requirement for post-processing annealing.

20 Claims, 10 Drawing Sheets

METHOD FOR CREATING AN OPTICAL STRUCTURE WITHIN A PHOTOSENSITIVE LIGHT TRANSMISSIVE MATERIAL AND OF ENHANCING THE PHOTOSENSITIVITY OF THE PHOTOSENSITIVE LIGHT TRANSMISSIVE MATERIAL

FIELD OF THE INVENTION

The present invention relates broadly to a method of enhancing the photosensitivity of a photosensitive light transmissive material and to a method of creating an optical structure within a photosensitive light transmissive material. The present invention has applications in the creation of gratings and similar structures within optical waveguides, including in optical fibres, and the invention is hereinafter described in that context. However, it will be understood that the invention does have broader applications, including to the enhancement of the photosensitivity of various types of photosensitive light transmissive materials, and in various forms such as in planar form or in optical fibre form.

BACKGROUND OF THE INVENTION

The creation of optical structures within photosensitive light transmissive materials, such as the writing of gratings in an optical fibre, is a significant process within optical technologies such as the technology of wavelength division multiplexing.

In the writing of gratings it is typically desirable to achieve high refractive index contrasts within a selected region of the optical fibre, the regions of different refractive index forming the optical grating structure. Whilst different techniques have been utilised to create photosensitive optical fibres or to enhance the photosensitivity of optical fibres, surprisingly the underlying chemistry and physics giving rise to both the photosensitivity and the ultimate refractive index changes exploited during the writing process remain poorly understood, even from a phenomenological viewpoint.

Therefore, developments in the area of photosensitising optical fibres have suffered in that they were primarily motivated through trial and error type experiments, some of which had the desired result of for example enhancing the photosensitivity in optical fibres.

As an example, it was found that hydrogen-loading of optical fibres facilitates the writing of stronger gratings that might otherwise be achieved. The hydrogen-loading is believed to have the effect of enhancing the photosensitivity of the optical fibre, particularly in those which exhibit relatively weak inherent photosensitivity. However, as mentioned above, the underlying chemistry and physics given rise to the enhanced photosensitivity have not been fully understood.

Also, it has been established that gratings that are written into hydrogen-loaded fibres exhibit a rapid initial decay which reflects in a poor long term stability of the high contrast gratings. Thus refrigeration based storage to maintain the high contrast gratings is required, and at the same time undesirable absorption peaks due to hydride-hydroxy absorption bands due to the hydrogen species remaining in the optical fibre have to be accepted.

It will be appreciated from the above that there is a need for alternative methods of enhancing the photosensitivity of photosensitive light transmissive materials and for creating optical structures in the photosensitive light transmissive material.

SUMMARY OF THE INVENTION

In accordance with a first aspect of the present invention, there is provided a method of creating an optical structure within a photosensitive light transmissive material comprising the steps of (a) exposing a selected region of the material to optical radiation at a wavelength selected to effect a refractive index change in the material ,(b) terminating the exposure to the radiation at a selected fluence; and afterwards (c) exposing at least one portion of the selected region to UV radiation at a level sufficient to vary the refractive index of the material within the selected region to from the optical structure; wherein the fluence is selected to render the optical structure substantially thermally stable at temperatures up to 250° C. without a requirement for post-processing annealing.

It has been found by the applicant that the photosensitisation mechanism within a photosensitive light transmissive material is essentially a two-step process involving the successive formation of a first species in the material and of a second species in the material from the first species. The formation of the first species results in a first refractive index change in the material and the transformation into the second species results in a second refractive index change in the material. Having recognised the two-step nature of the photosensitisation process, the present invention in at least preferred embodiments can provide a method for an optimum pre-sensitisation of the photosensitive light transmissive material.

The term "species" in not intended to be limited to be of a chemical nature but rather it can also, alternatively or in addition, be of a physical nature.

In one embodiment, the selected region comprises an intended optical grating region and the step of exposing the at least one portion of the selected region to the UV radiation comprises exposing periodic regions within the grating region to create a periodic grating structure within the region.

The method preferably further comprises the step of hydrogen-loading the selected region prior to the initial exposure to the radiation. It has been found by the applicant that hydrogen can act as a catalyst in the underlying process. In such embodiments, the method can preferably further comprise the step of removing the hydrogen-loading by out-diffusion after the initial exposure to the radiation.

The initial exposure of the material to the radiation can be controlled to be substantially uniform throughout the selected region. Alternatively, the initial exposure to the radiation can be controlled to be non-uniform to effect a non-uniform photosensitivity of the material throughout the selected region.

The wavelengths of the radiation or the UV-radiation can be about 244 nm or about 193 nm.

The radiation used in step (a) can be the UV-radiation of step (c).

The photosensitive light transmissive material may be in the form of an optical fibre.

In a second aspect, the formation of the optical structure may be effected in a two stage process, in which case the first stage is defined as providing a method of enhancing the photosensitivity of a photosensitive light transmissive material comprising the steps of (a) exposing a selected region of the material to optical radiation at a wavelength selected to induce a refractive index change in the material within the selected region; and(b) terminating the exposure to the radiation at a selected fluence; wherein the fluence is selected to render the exposed region substantially thermally stable at temperatures up to 250° C. without a requirement for post-processing annealing after an optical structure is formed by exposing at least one portion of the selected region to UV radiation at a level sufficient to vary the refractive index of the material within the selected region.

Preferably, the method further comprises the step of hydrogen-loading the selected region prior to the exposure to the radiation.

Where the method comprises the step of hydrogen-loading the selected region prior to the exposure to the radiation, the method can further comprise the step of removing the hydrogen-loading by out-diffusion after the exposure to the radiation.

The exposure of the material to the radiation is preferably controlled to be substantially uniform throughout the selected region. Alternatively, the exposure to the radiation is controlled to be non-uniform to effect a non-uniform photosensitivity of the material throughout the selected region.

The wavelength of the radiation may be about 244 nm or about 193 nm.

The photosensitive light transmissive material may be in form of an optical fibre.

In accordance with a third aspect of the present invention, there is provided an optical structure formed in a photosensitive light transmissive material by a method as defined in the first aspect of the present invention.

In accordance with a fourth aspect of the present invention, there is provided a photosensitive light transmissive material having an enhanced photosensitivity achieved by a method as defined in the second aspect of the present invention.

Preferred forms of the invention will now be described, by way of example only, with reference to the accompanying drawings, in which:

DETAILED DESCRIPTION OF THE PREFERRED EMBODIMENTS

The applicant has recognised that the photosensitisation and resulting UV induced refractive index change occur essentially via a two-step process which may be described by the following reaction equation:

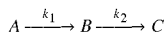

$k_1$ and $k_2$ are the rate coefficients describing the transformation of species A to species B and subsequently B to species C. The nature of the these species is uncertain and will vary for different material, but C is believed to be related to one or more forms of a GeE' centre in germano-silicate. The rate of formation of C, which is related to the final index change achieved in this mechanism, depends on the consumption of B. However, B is not constant since it is itself formed from A. It is believed that the formation of B itself also results in an intermediate index change.

From reaction theory, the rate coefficients of formation for the species are:

$$\dot{A} = -k_1[A]$$

$$\dot{B} = k_1[A] - k_2[B]$$

$$\dot{C} = -k_2[B]$$

Integrating, subsequently substituting where necessary whilst noting that the sum of the concentrations of all the species at any given time must equal the initial concentration of A, $[A]_0$, leads to the following solutions for the evolution of each species concentration as the reaction progresses with time:

$$[A] = [A]_0 e^{-k_1 t}$$

$$[B] = k_1 [A]_0 \left\{ \frac{e^{-k_1^t} - e^{-k_2^t}}{k_2 - k_1} \right\}$$

$$[C] = [A]_0 \left\{ 1 + \left( \frac{k_1 e^{-k_2^t} - k_2 e^{-k_1^t}}{k_2 - k_1} \right) \right\}$$

Figure 1:
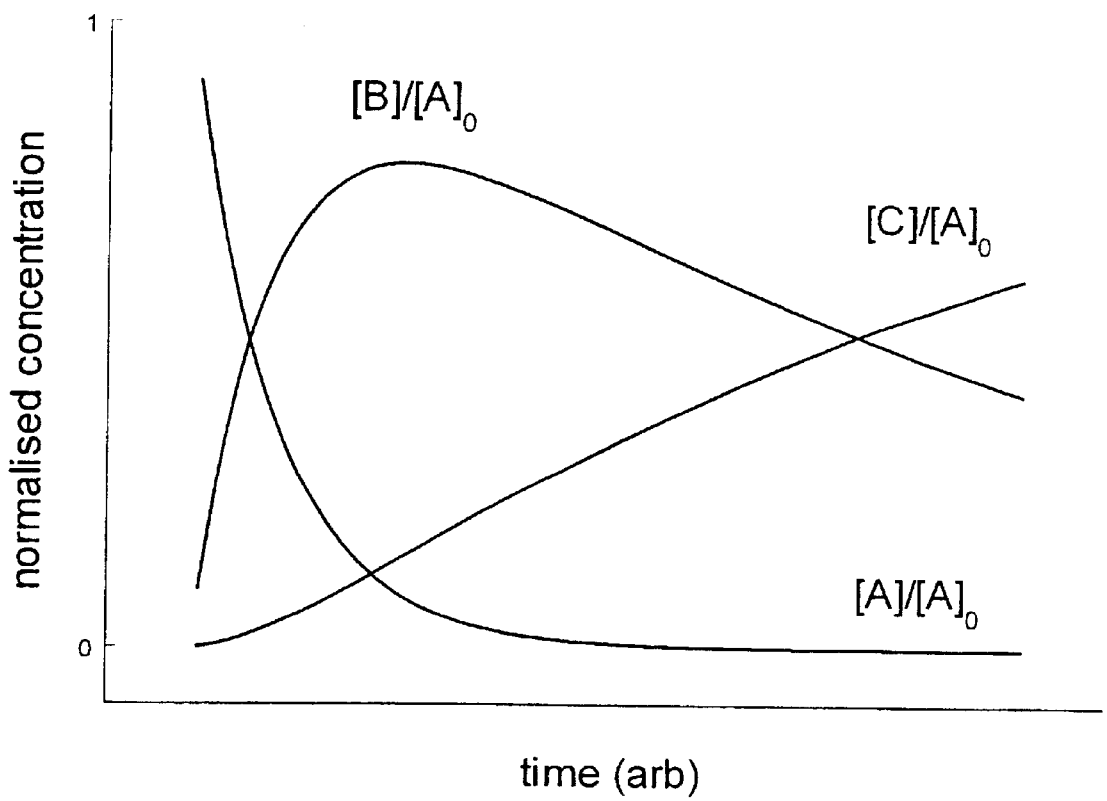
FIG. 1 shows the normalised evolution of the main species involved with photosensitisation embodying the present invention.
Figure 2:
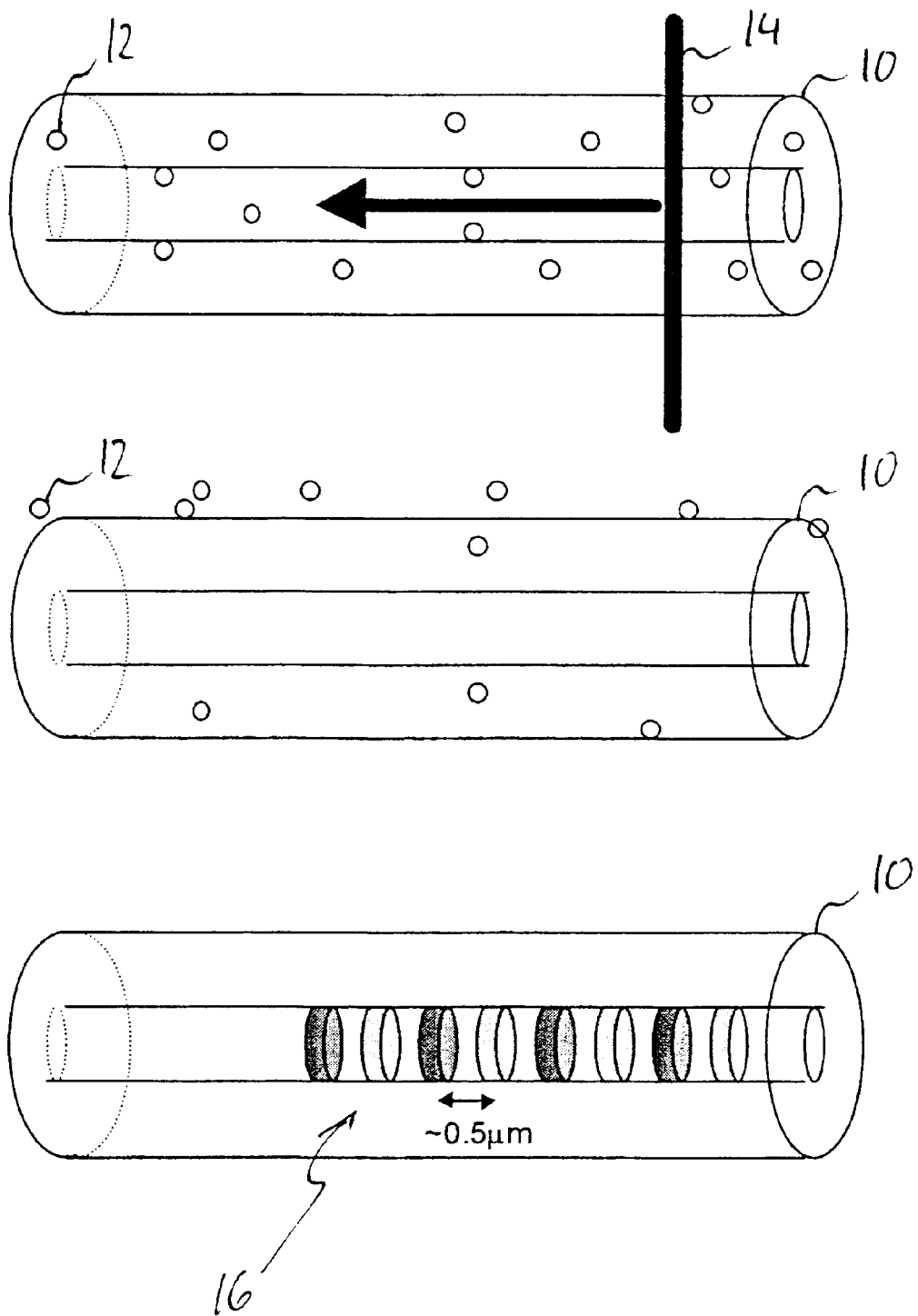
FIG. 2 is a series of three drawings illustrating the photosensitization process embodying the present invention.

A plot of the growth and decomposition of the species, normalised with respect to the initial concentration of A, $[A]_0$, with time is shown in FIG. 1. In FIG. 2, the resultant overall refractive index change 100 as a function of fluence is plotted.

One can deduce from this model that there is an optimum fluence at which the pre-exposure will be most efficient. This will coincide with the maximum concentration of B, i.e. when the material is most "photosensitive" in terms of refractive index changes through formation of C. This point coincides with the roll-over point from the main contribution of the refractive index change coming from formation of species B to the main contribution coming from formation of species C.

Once grating writing is completed after the pre-exposure, only the unexposed regions (during the grating writing) retain the contribution of B whereas the peak exposures experience transformation of B to form C. Thus a maximum index contrast per grating writing exposure time can be achieved between the exposed and the un-exposed areas.

It is further proposed that in the above model hydrogen plays a catalytic role in enhancing the process—this is supported by the experimental observation that the out-diffusion of hydrogen does not affect strong grating writing within a photosensitised fibre and no significant hydrogen species formation occurs.

For example, B may involve Ge—H radical formation since this bond has been shown to increase the 240 nm absorption band. However, this step may not contribute overall directly to the index change other than through an increase in the concentration of B, i.e. enhanced absorption sites for formation of C. In this case, it is predicted by the applicant that the thermal stability of an optical structure written in accordance with an embodiment of the present invention should be enhanced over conventionally-written structures in both hydrogen loaded and unloaded photosensitive materials.

As mentioned above, C may involve GeE' formation. Consequently, with the exception of the kinetic rates and maximum saturable index, photosensitisation is identical in fibres with and without loading. This similarity indicates that the primary role of hydrogen is to prevent recombination and relaxation, which occurs in unloaded fibres, through alternative pathways and possibly through the dissociation of any hydride formation.

EXAMPLE I

Photosensitisation With CW 244 nm and Subsequent Grating Writing With CW 244 nm The procedure for photosensitising the fibre is outlined in FIG. 2. The fibre 10 is loaded with hydrogen 12 at a temperature of 353K and pressure of 200 atm for one day. It is then uniformly exposed to CW 244 nm (~3 W/cm$^2$) light 14 from a frequency-doubled Ar$^+$ laser (not shown) by scanning the beam over 1 cm of fibre (see the upper drawing in FIG. 2). A single pass over 1 cm at 10 mm/s was used giving a total fluence of ~50 J/cm$^2$. For reference, another piece of similarly hydrogenated fibre was not presensitised. The fibres 10 were then left out in room temperature for 15 days to allow hydrogen out-diffusion prior to grating writing at 244 nm (see the middle drawings in FIG. 2). The 1 cm gratings 16 were written by scanning the beam over one or more passes (2 mm/min, fluence: ~600 J/cm$^2$, power density: 330 mW/mm$^2$) (see the lower drawing in FIG. 2).

Figure 3:
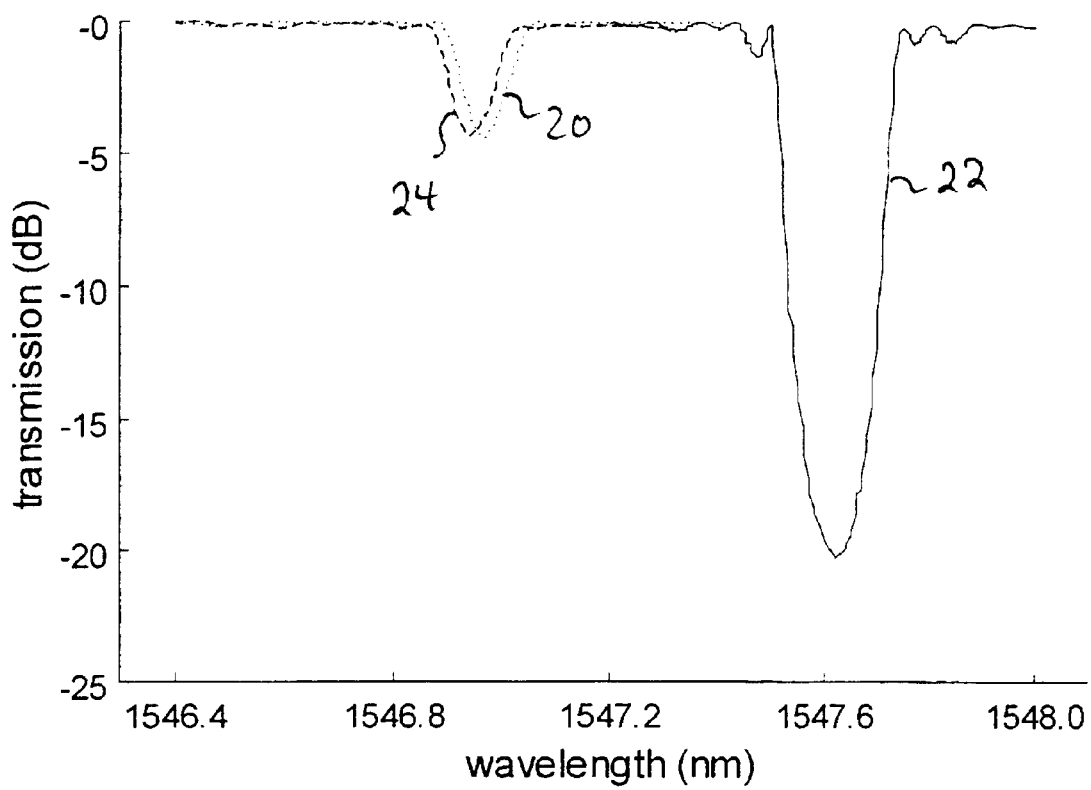
FIG. 3 shows comparative transmission versus wavelength plots of conventional gratings and gratings embodying the present invention.

The results are summarised in FIG. 3. Without presensitisation, the grating strength possible after out-diffusion was ~4.3 dB (curve 20). For the same fluence in the 244 nm pre-sensitised fibre the grating strength was ~21 dB after out-diffusion (curve 22). Also shown is data for a grating written into an unhydrogenated fibre (curve 24).

Figure 4:
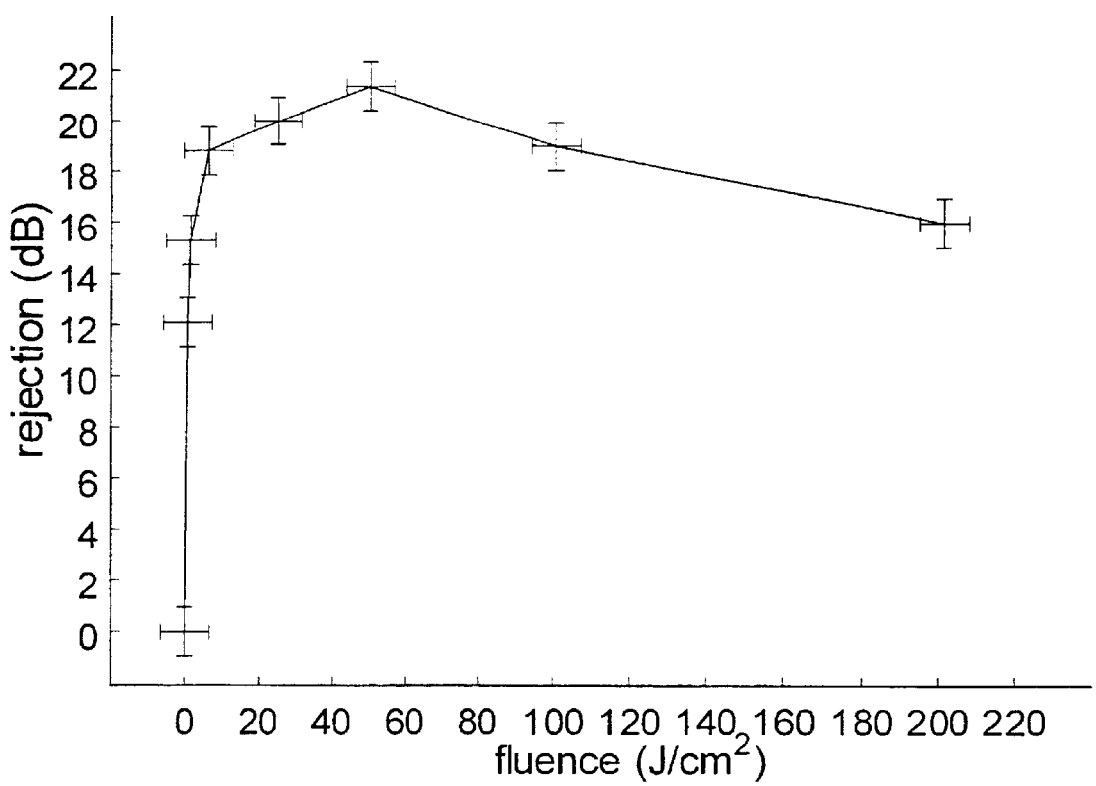
FIG. 4 shows saturated grating rejection as a function of initial CW 244 nm sensitisation fluences.

Subsequently, gratings were written into several fibres pre-exposed with varying amounts of initial sensitisation fluence. Identical writing conditions were maintained and the results are plotted in figure. 4. The writing fluence used was the same as that above, ~600 J/cm$^2$. An optimum sensitisation fluence can be observed at 50 J/cm$^2$. Clearly, beyond this value the benefit of continued pre-exposure diminishes. The maximum grating strength obtained was ~21.5 dB under the writing fluence used.

EXAMPLE II

Photosensitization Using 193 nm

The above experiments were repeated using a pre-sensitising wavelength at 193 nm from a pulsed ArF laser instead of CW 244 nm. This was to determine whether the chemical route for photosensitisation was sufficiently generic to account for the behaviour observed at other wavelengths. In addition, there is some interest in using the higher energy densities of the pulsed halide gas lasers to accelerate the pre-sensitisation process whilst confining coherent CW sources for the often complex grating writing procedures.

Figure 5:
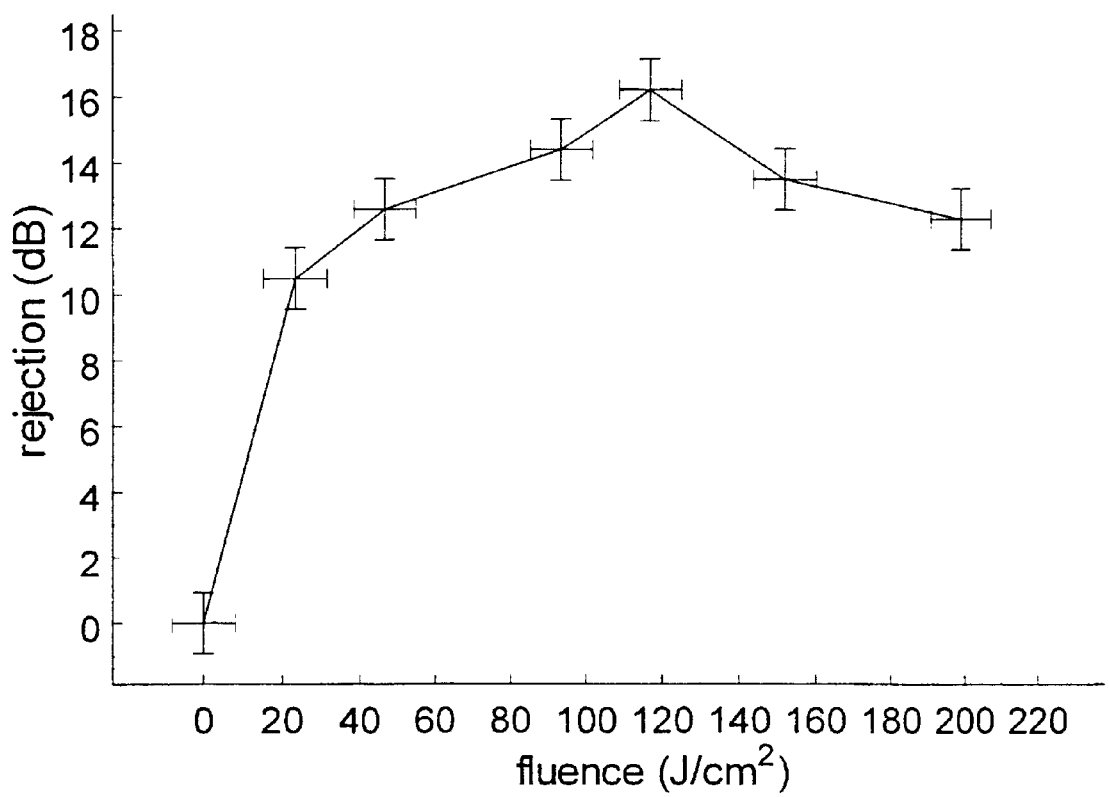
FIG. 5 shows saturated grating rejection as a function of initial pulsed 193 nm sensitisation fluences.

Different fluences were used and subsequent grating writing was carried out at CW 244 nm under identical conditions to that listed above. The results are shown in FIG. 5. Cross-mixing of the wavelengths is possible, indicating common defect sites involved in both pre-sensitisation methods. However, the required fluence is substantially larger (~120 J/cm$^2$) and the maximum grating strength is less (~16.5 dB) for the same writing fluence of ~600 J/cm$^2$. It was also observed that even at very low 193 nm pre-sensitisation fluences where no effect was observed on grating strength, blue luminescence was strong.

In order to account for differences in optimum pre-sensitisation fluence, the UV spectra of a preform similar to that used to fabricate the fibre was taken. A CARY170 spectrophotometer flushed continuously with ultra-high purity nitrogen (spectrally flat down to 180 nm) capable of measuring from 190 to 1100 nm was used for the measurements. The preform core was milled out, polished and suspended in a quartz cell filled with doubly distilled and de-ionised water to assist reducing scattering losses off the milled core surface. The water was measured to be flat over the wavelength of interest and a calibration cell filled with the same water and a reference pure silica core was also used. Multiple scans were taken at intervals to ensure reproducibility.

Figure 6:
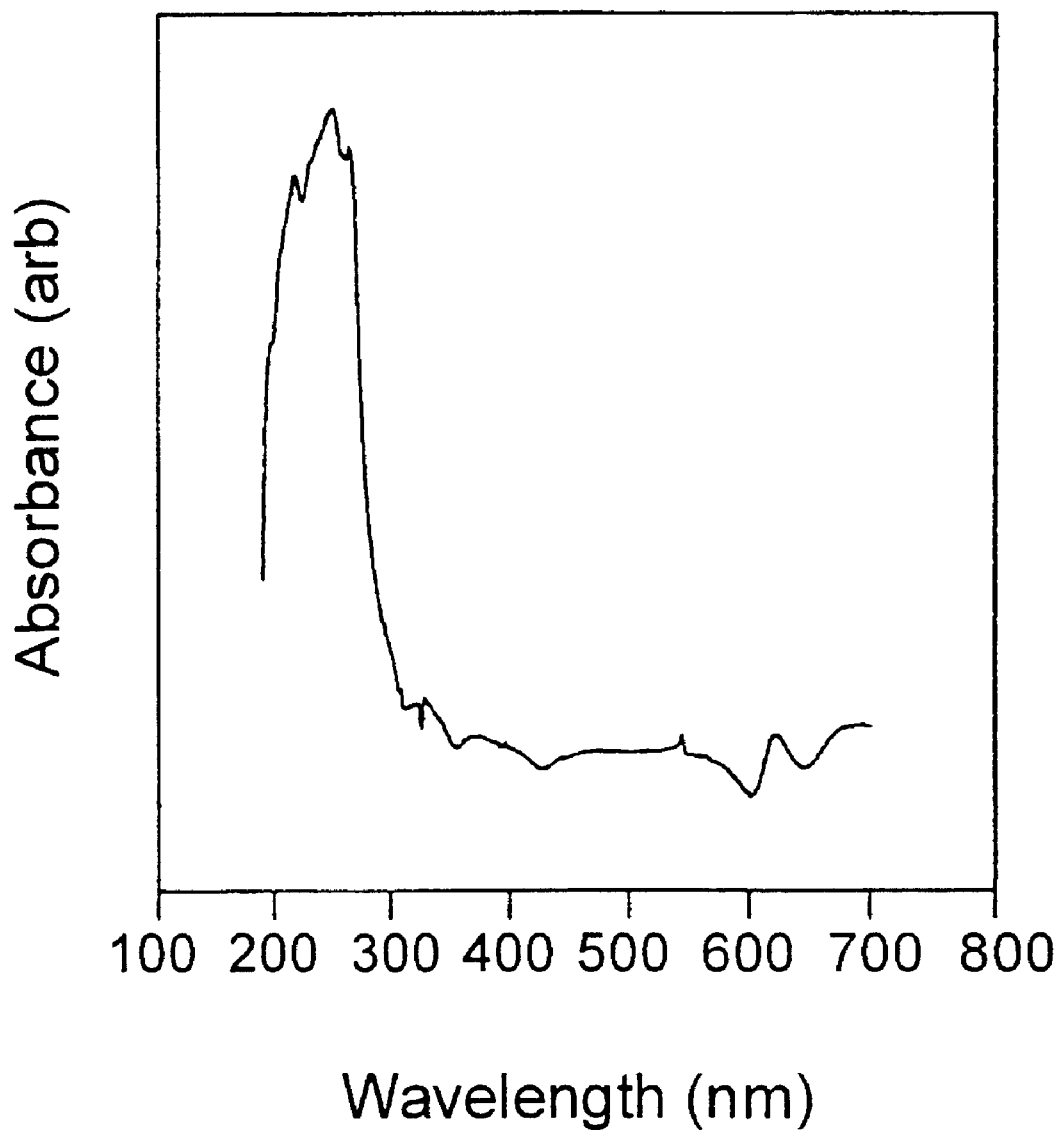
FIG. 6 shows a UV absorption profile of a boron co-doped germano-silicate preform core.

FIG. 6 shows the measured UV absorption spectrum of the preform core. The 193 nm absorption is substantially less than at 244 nm and the band edge of the glass is not seen above 190 nm. Thus it can be concluded that the induced changes are achieved through an identical defect path using either wavelength during the pre-sensitisation stage, indicating that in germanosilicate fibres at least the dominant photosensitivity process is the same at both wavelengths. Two-photon absorption processes are also unlikely to contribute to the index change within these fibres—instead, these may account for the relative decrease in grating strength obtained with pulsed 193 nm pre-sensitisation compared to that with CW 244 nm.

Annealing studies will now be described to investigate the thermal stability of the preferred embodiments of the present invention. The annealing studies were carried out between conventional strong gratings written directly into hydrogen loaded boron-codoped germanosilicate optical fibre and similar fibre pre-exposed with the hydrogen subsequently out-diffused.

Figure 7:
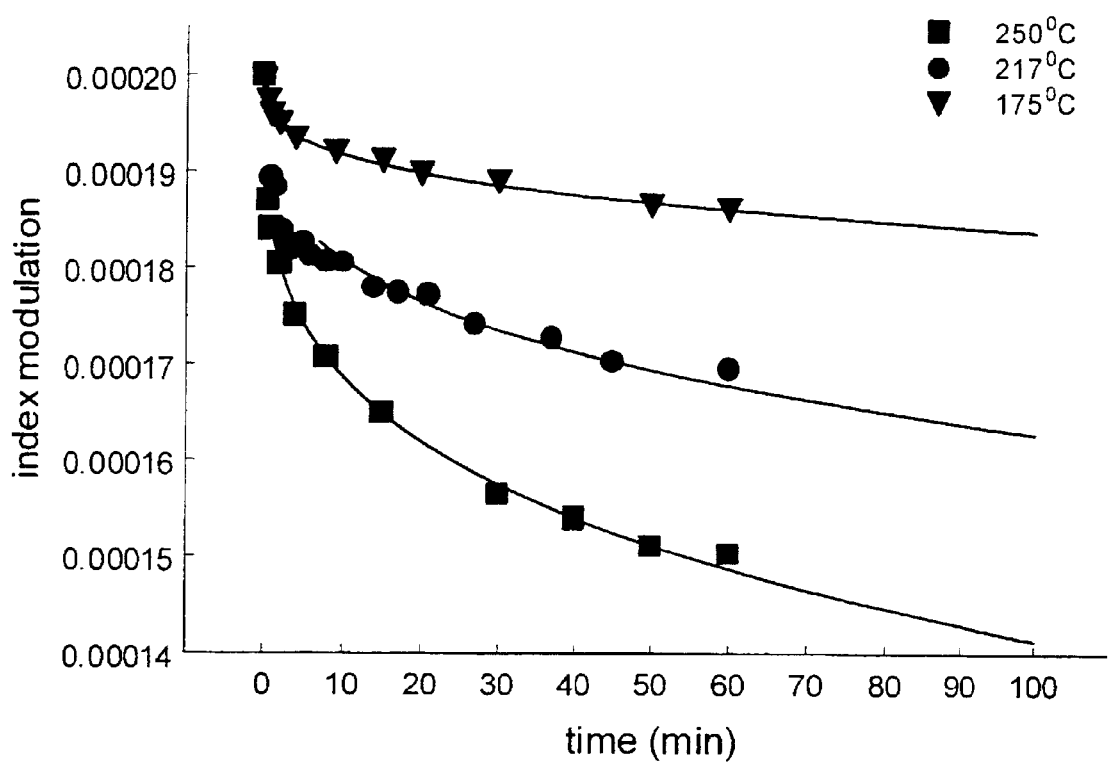
FIG. 7 shows aging curves for standard hydrogen-loaded gratings.
Figure 8:
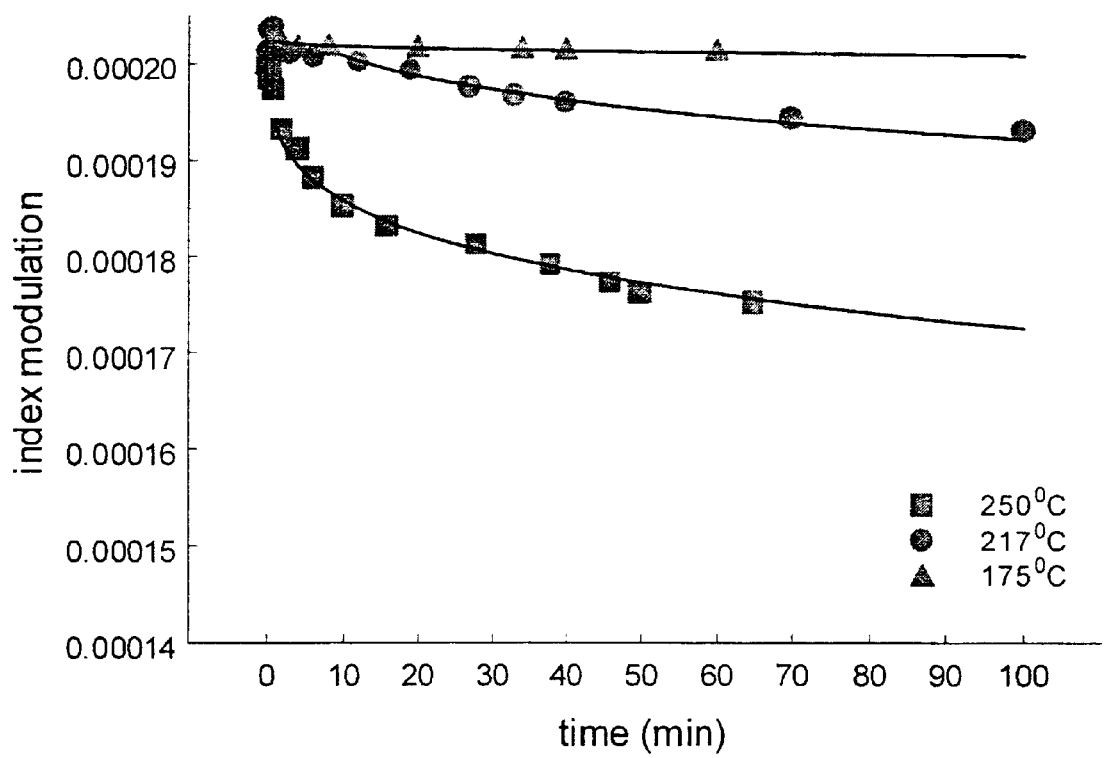
FIG. 8 shows aging curves for pre-sensitised gratings embodying the present invention.
Figure 9:
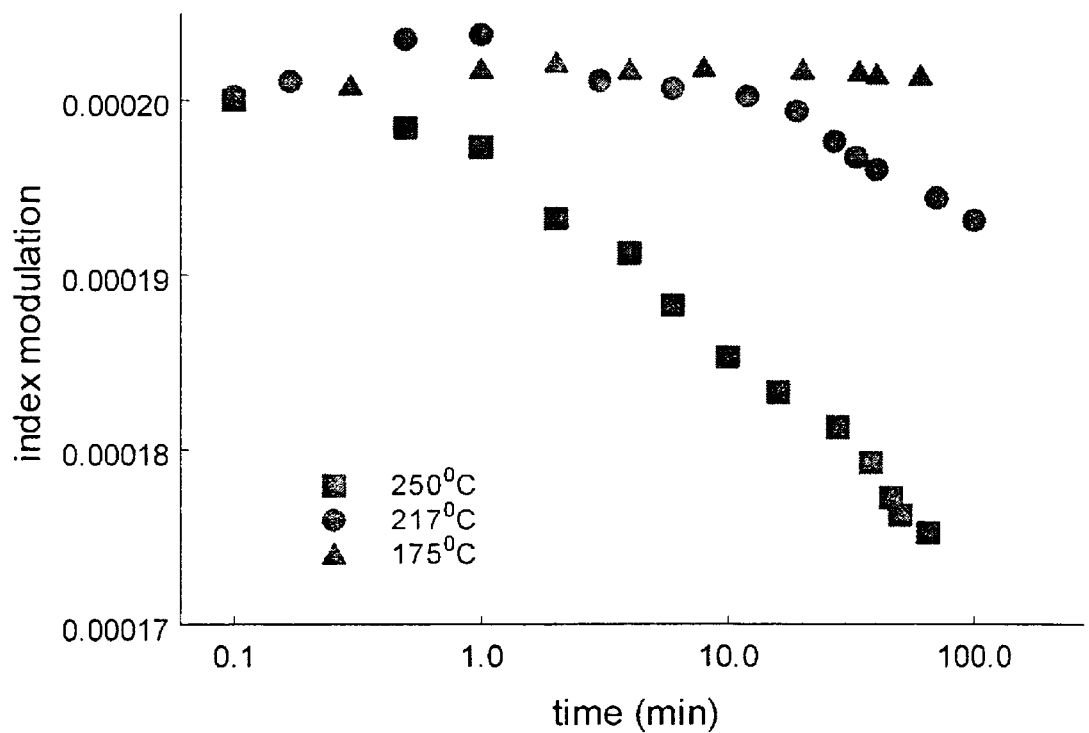
FIG. 9 shows the aging curves of FIG. 8 on a logarithmic scale.

Similar strength gratings were written into each fibre and subsequently annealed at three different temperatures. The aging data, together with fitted stretched exponential curves, are shown in FIGS. 7 and 8. When expanded on a log scale it is observed that at low temperatures the pre-sensitised grating strength actually increases during the decay process, as shown in FIG. 9.

This can be explained by noting that those regions which remain nominally unexposed during grating writing (the troughs of the writing fringe) have a faster decay than elsewhere since the species B which was created during pre-exposure has not been bleached to form C during grating writing.

Figure 10:
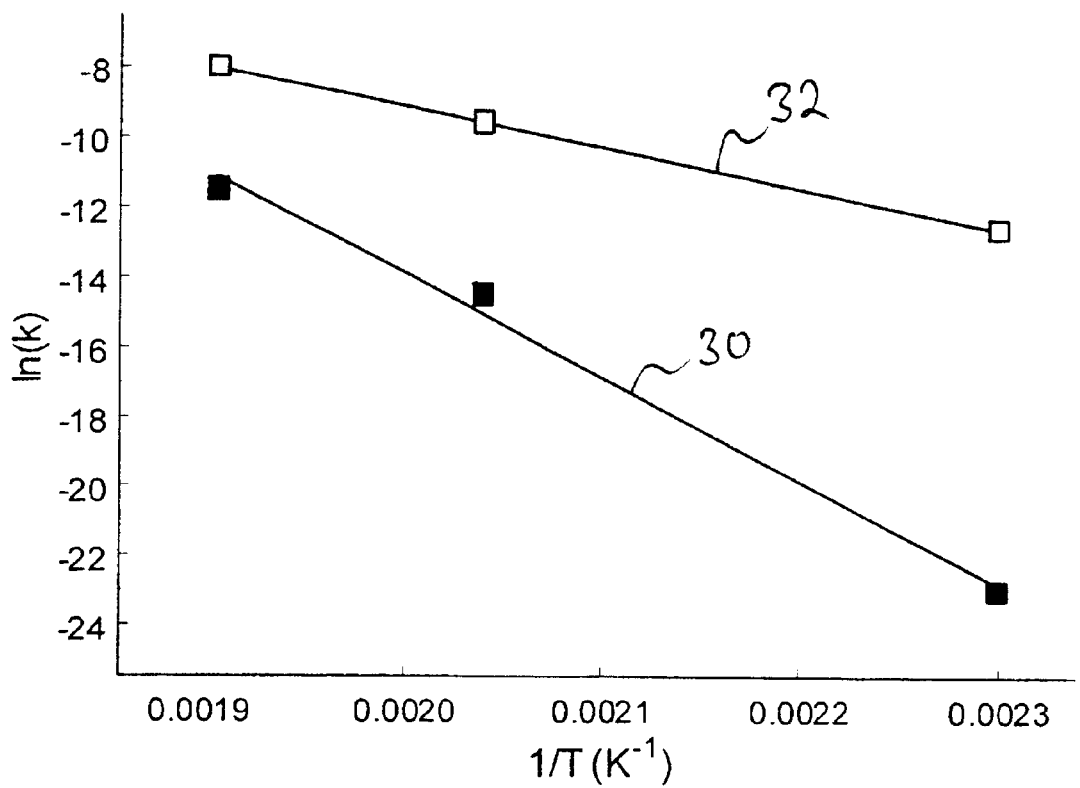
FIG. 10 shows Arrhenius plots for conventional gratings and gratings embodying the present invention.

From the Arrhenius plots shown in FIG. 10, one can obtain the necessary data to extrapolate the stretched exponential fits to 25 years and estimate the expected decay. For the fully hydrogen loaded case (curve 30) the decay is around 68%, in agreement with previous results for hydrogen loaded gratings.

However, for the pre-exposed case (curve 32) where the hydrogen is subsequently out-diffused prior to grating writing, the decay is only 0.1%. This is better than most stabilised gratings indicating that thermal stabilisation of these gratings after writing is not necessary.

Further, the decay of conventional hydrogen loading gratings is found to be such that the final grating strength is less than the pre-sensitised gratings before its stability is assured over 25 years. As can be imagined this has major implications for grating manufacture—the removal of an entire phase of the production process has direct implications for commercial productivity.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A method of creating an optical structure within a photosensitive light transmissive material comprising the steps of:
   (a) exposing a selected region of the material to optical radiation at a wavelength selected to effect a refractive index change in the material
   (b) terminating the exposure to the radiation at a selected fluence; and afterwards
   (c) exposing at least one portion of the selected region to UV radiation at a level sufficient to vary the refractive index of the material within the selected region to form the optical structure;
   wherein the fluence is selected to render the optical structure substantially thermally stable at temperatures up to 250° C. without a requirement for post-processing annealing.

2. A method as claimed in claim 1, wherein the selected region comprises an intended optical grating region and the step of exposing the at least one portion of the selected region to the UV radiation comprises exposing periodic regions within the grating region to create a periodic grating structure within the region.

3. A method as claimed in claim 1, further comprising the step of hydrogen loading the selected region prior to the initial exposure to the radiation.

4. A method as claimed in claim 3, further comprising the step of removing the hydrogen loading by out-diffusion after the initial exposure to the radiation.

5. A method as claimed in claim 1, wherein the initial exposure of the material to the radiation is controlled to be substantially uniform throughout the selected region.

6. A method as claimed in claim 1, wherein the initial exposure to the radiation is controlled to be non-uniform to effect a non-uniform photosensitivity of the material throughout the selected region.

7. A method as claimed in claim 1 wherein the wavelengths of the radiation or the UV-radiation is about 244 nm.

8. A method as claimed in claim 1 wherein the wavelengths of the radiation or the UV-radiation is about 193 nm.

9. A method as claimed in claim 1 wherein the radiation used in step (a) is the UV radiation of step (c).

10. A method as claimed in claim 1 wherein the photosensitive light transmissive material is in the form of an optical fibre.

11. An optical structure formed in a photosensitive light transmissive material by a method as claimed in claim 1.

12. A method of enhancing the photosensitivity of a photosensitive light transmissive material comprising the steps of:
    a) exposing a selected region of the material to optical radiation at a wavelength selected to induce a refractive index change in the material within the selected region; and
    (b) terminating the exposure to the radiation at a selected fluence;
    wherein, the fluence is selected to render the exposed selected region substantially thermally stable at temperatures up to 250° C. without a requirement for post-processing annealing after an optical structure is formed within the selected region by exposing at least one portion of the selected region to UV radiation at a level sufficient to vary the refractive index of the material within the selected region.

13. A method as claimed in claim 12, further comprising the step of hydrogen loading the selected region prior to the exposure to the radiation.

14. A method as claimed in claim 13, further comprising the step of removing the hydrogen loading by out-diffusion after the exposure to the radiation.

15. A method as claimed in claim 13, wherein the exposure of the material to the radiation is controlled to be substantially uniform throughout the selected region.

16. A method as claimed in claim 13, wherein the exposure to the radiation is controlled to be non-uniform to effect a non-uniform photosensitivity of the material throughout the selected region.

17. A method as claimed in claim 13, wherein the wavelengths of the radiation is about 244 nm.

18. A method as claimed in claim 13, wherein the wavelengths of the radiation is about 193 nm.

19. A method as claimed in claim 13, wherein the photosensitive light transmissive material is in the form of an optical fibre.

20. A photosensitive light transmissive material having an enhanced photosensitivity achieved by a method as claimed in claim 13.

* * * * *